US011456913B2

(12) United States Patent
Toyoda et al.

(10) Patent No.: US 11,456,913 B2
(45) Date of Patent: Sep. 27, 2022

(54) ON-VEHICLE COMMUNICATION SYSTEM

(71) Applicant: YAZAKI CORPORATION, Tokyo (JP)

(72) Inventors: Ryoma Toyoda, Makinohara (JP); Kunihiko Yamada, Makinohara (JP); Masashi Tsukamoto, Makinohara (JP); Junki Ema, Makinohara (JP); Masaaki Suguro, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 116 days.

(21) Appl. No.: 17/177,193

(22) Filed: Feb. 16, 2021

(65) Prior Publication Data

US 2021/0258204 A1 Aug. 19, 2021

(30) Foreign Application Priority Data

Feb. 17, 2020 (JP) ............................ JP2020-024614

(51) Int. Cl.
*H04L 41/0659* (2022.01)
*G06F 1/30* (2006.01)
(Continued)

(52) U.S. Cl.
CPC ............ *H04L 41/0659* (2013.01); *G06F 1/30* (2013.01); *H04L 41/12* (2013.01); *H04L 2012/40215* (2013.01); *H04L 2012/40273* (2013.01)

(58) Field of Classification Search
CPC ... B60R 16/023; B60R 16/03; B60R 16/0207; G05B 23/0213; G06F 1/30;
(Continued)

(56) References Cited

U.S. PATENT DOCUMENTS

2001/0043563 A1* 11/2001 Gerstel ............... H04J 14/0297 370/216
2002/0101869 A1* 8/2002 Garcia-Luna-Aceves .................. H04W 40/023 370/389
(Continued)

FOREIGN PATENT DOCUMENTS

EP 3 476 661 A1 5/2019
JP 2018-142862 A 9/2018
(Continued)

*Primary Examiner* — Le H Luu
(74) *Attorney, Agent, or Firm* — Kenealy Vaidya LLP

(57) ABSTRACT

Switching hubs such as relay devices capable of path control are arranged at a plurality of branch positions respectively on a wire harness including a trunk line of a communication line. Each of the relay devices includes a failure detection part, a routing map, and a path control part. The trunk line of the communication line is formed to make it possible to use a plurality of types of paths selectively. When the failure detection part in any relay device detects a failure, an instruction of path change is given to another relay device therefrom. When any relay device receives an instruction of path change from another relay device, the routing maps in the relay device receiving the instruction are switched according to a failure occurrence portion. A VLAN is constructed on an Ethernet communication network, and logical assignment of the VLAN is controlled by a central gateway.

4 Claims, 11 Drawing Sheets

(51) Int. Cl.
*H04L 41/12* (2022.01)
*H04L 12/40* (2006.01)

(58) Field of Classification Search
CPC ............. G06F 11/0751; G06F 11/0784; G06F 11/2007; G06F 11/2015; H04L 12/40; H04L 12/40176; H04L 12/42; H04L 41/0659; H04L 41/12; H04L 41/0668; H04L 45/22; H04L 45/28; H04L 45/02; H04L 45/24; H04L 45/50; H04L 2012/40215; H04L 2012/40273; H04L 69/40; G06V 20/58; H04J 14/0297; H04J 3/14; H04Q 3/0079; H04W 40/023
See application file for complete search history.

(56) References Cited

U.S. PATENT DOCUMENTS

2002/0107980 A1* 8/2002 Kawaguchi ............. H04L 45/24 714/E11.054
2002/0196784 A1* 12/2002 Masuda .................... H04J 3/14 370/245
2003/0043779 A1 3/2003 Remboski et al.
2003/0198180 A1* 10/2003 Cambron ............. H04Q 3/0079 370/216
2004/0196783 A1* 10/2004 Shinomiya .......... H04L 41/0668 370/216
2005/0237927 A1* 10/2005 Kano ...................... H04L 45/50 370/216
2006/0013127 A1* 1/2006 Izaiku ..................... H04L 45/02 370/242
2006/0198315 A1* 9/2006 Sasagawa ............... H04L 69/40 370/244
2006/0256712 A1* 11/2006 Imajuku .................. H04L 45/22 370/228
2018/0097721 A1 4/2018 Matsui et al.
2018/0248583 A1 8/2018 Sekiya et al.
2019/0118739 A1* 4/2019 Takamatsu .......... B60R 16/0207
2019/0118742 A1 4/2019 Takamatsu et al.
2019/0118743 A1 4/2019 Takamatsu et al.
2019/0118744 A1 4/2019 Takamatsu et al.
2019/0123472 A1 4/2019 Takamatsu et al.
2019/0123480 A1 4/2019 Takamatsu et al.
2019/0123920 A1 4/2019 Takamatsu et al.
2019/0123937 A1 4/2019 Takamatsu et al.
2019/0126860 A1 5/2019 Takamatsu et al.
2019/0126862 A1 5/2019 Sasaki et al.
2019/0126863 A1 5/2019 Naganishi et al.
2019/0126864 A1 5/2019 Takamatsu et al.
2019/0126865 A1 5/2019 Takamatsu et al.
2019/0258251 A1* 8/2019 Ditty ...................... G06V 20/58
2020/0180530 A1 6/2020 Yasunori
2021/0197743 A1 7/2021 Takamatsu et al.

FOREIGN PATENT DOCUMENTS

JP 2019-137394 A 8/2019
WO 2017/222058 A1 12/2017
WO 2018/230132 A1 12/2018

* cited by examiner

ON-VEHICLE COMMUNICATION SYSTEM

CROSS REFERENCE TO RELATED APPLICATIONS

This application is based on and claims priority from Japanese patent application No. 2020-024614 filed on Feb. 17, 2020, the entire contents of which are incorporated herein by reference.

TECHNICAL FIELD

The present invention relates to an on-vehicle communication system that can be used for communication between a plurality of electrical components via a transmission path of a wire harness on a vehicle, and particularly relates to a technique for coping with a failure such as disconnection of a communication path.

BACKGROUND ART

For example, as disclosed in JP-A-2019-137394, a technique for simplifying a wiring path of a wire harness on a vehicle and shortening an electric wire length is applied to a wiring structure of wire harness. Further, it is disclosed that the technique is implemented with: a power supply that supplies power in the vehicle; a plurality of power supply distributors; a power supply trunk line that is wired between the plurality of power supply distributors along a front-rear direction of the vehicle or a width direction of the vehicle; a power supply line that is wired between the power supply and at least one of the plurality of power supply distributors; a plurality of communication control parts that control the plurality of power supply distributors; and a communication trunk line that is wired between the plurality of communication control parts.

Further, as shown in FIG. 8 and disclosed in [0033] of JP-A-2019-137394, one loop is formed including a first communication control part 21*a*, a first communication trunk line 22*a*, a second communication control part 21*b*, a second communication trunk line 22*b*, a third communication control part 21*c*, a third communication trunk line 22*c*, a fourth communication control part 21*d*, and a fourth communication trunk line 22*d*. Accordingly, when a communication control part detects disconnection of a communication trunk line connected to the communication control part, the communication control part cuts off electrical connection with the disconnected communication trunk line. Then, a current can be supplied to the communication control part via a communication trunk line of another path. For example, when the second communication control part 21*b* detects disconnection of the first communication trunk line 22*a*, electrical connection with the first communication trunk line 22*a* can be cut off and a current from the second communication trunk line 22*b* can be supplied to the second communication control part 21*b*. By forming a loop with a plurality of communication control parts and communication trunk lines in this manner, malfunction and failure of each part of the vehicle can be effectively prevented.

SUMMARY OF INVENTION

In a case where a communication path is formed in a loop form as shown in FIG. 8 of JP-A-2019-137394, even when a failure such as disconnection occurs in a part of the communication path, it is possible to secure a communication path by using another path in which no failure has occurred, and thus it is possible to improve communication reliability.

However, with respect to a typical on-vehicle system in the related art, in a case where a bus-type communication network such as a controller area network (CAN) is used therein, an initial communication path is determined according to a routing map determined in advance. But when a plurality of communication paths are connected in a loop form in order to back up for disconnection, a problem occurs that the routing map cannot be created.

Even if the on-vehicle system has a plurality of communication paths for backup, when it is found that communication via a certain communication path is not possible due to disconnection or the like, it is necessary to search for another communication path that can be used to switch the communication path. Therefore, there is possibility that a relatively long time is required before normal communication can be started.

In addition, for example, in a case of coping with high-speed communication at 100 Mbps or more, a relatively expensive communication device corresponding to a communication standard such as Ethernet (registered trademark) is required. In particular, in the case of an on-vehicle communication system, since a large number of electrical components are connected in a communication network thereof, it is assumed that a configuration of the network is complicated, and that a large number of relay devices and the like are connected to branch points of a wire harness and the like. Further, in order to facilitate switching of the communication path in consideration of possibility of disconnection, it is conceivable to connect an expensive communication device such as a router or an L (layer) 3 switch to various portions on the network, which may significantly increase the cost of the entire system.

In addition, since the on-vehicle system has a large number of electronic devices, and many of the electronic devices are mounted in a state of being distributed at various places on a vehicle body, a problem occurs that a path length of the wire harness used for communication is long. Furthermore, for example, when damage occurs in the vehicle body due to a traffic accident or the like, it is essential to consider possibility that disconnection of the wire harness occurs and communication cannot be performed between the plurality of electronic devices, and normal operations of the system cannot be maintained.

An on-vehicle communication system according to an embodiment is capable of, when a failure such as disconnection of a communication path occurs, enabling use of another communication path that is not disconnected, and reducing communication delay while preventing an increase in cost of the communication device.

An on-vehicle communication system in which a relay device capable of relay of communication and path selection according to a destination of communication is provided at each of a plurality of positions, for which branching off is possible, on a wire harness including a trunk line of a communication line.

In the on-vehicle communication system, each of a plurality of the relay devices includes:

- a failure detection part that detects disconnection or decrease in communication quality;
- a routing map in which a plurality of types of path information determined in advance is held in correspondence to presence or absence of a failure and each failure portion; and a path control part that controls switching of the routing map, in which the trunk line of the communication line is formed in a state where it is possible to selectively use a plurality of types of paths physically or logically, in which when the failure detection part of any relay device detects failure occurrence, the path control part in the relay device whose failure detection part detects the failure occurrence instructs another relay device to change a path, and in which when the failure detection part of any relay device receives an instruction of path change from another relay device, at least the routing map in the relay device whose failure detection part receives the instruction of path change is switched in accordance with a failure occurrence portion.

DESCRIPTION OF EMBODIMENTS

Specific embodiments according to the present invention will be described below with reference to the drawings.

First Embodiment

<Outline of Configuration of Communication System>

Figure 1:
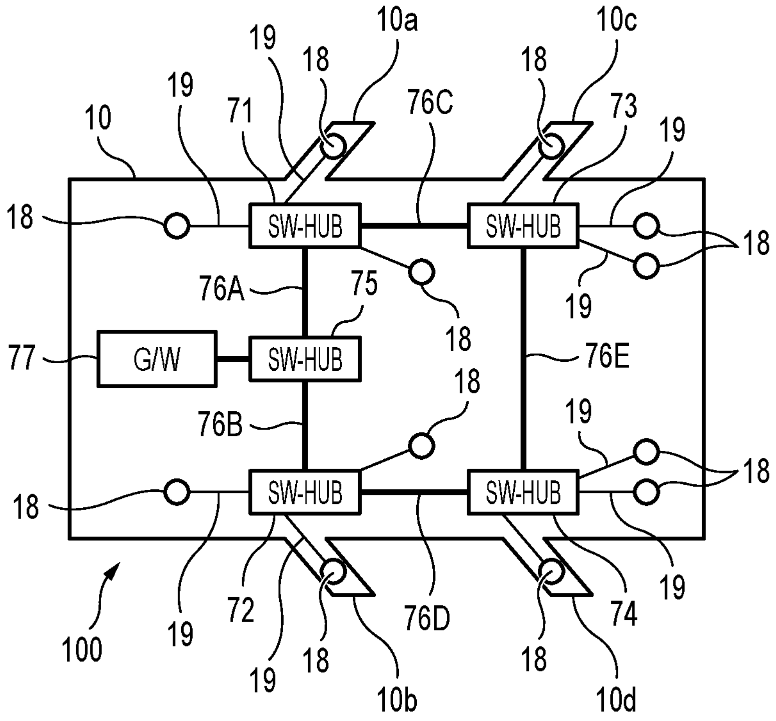
FIG. 1 is a block diagram showing a configuration of a communication system according to a first embodiment that is mounted on a vehicle.

FIG. 1 shows a configuration of a communication system according to a first embodiment that is mounted on a vehicle.

It is assumed that a communication system 100 of the present embodiment is used in a state of being mounted on a vehicle such as an automobile. FIG. 1 shows a layout of components in a plane as viewing a vehicle body 10 from above. In FIG. 1, a left side represents a front side of the vehicle body 10 and a right side represents a rear side of the vehicle body 10. Four doors 10*a*, 10*b*, 10*c*, and 10*d* are arranged on left and right sides of the vehicle body 10.

As shown in FIG. 1, various types of electrical components 18 are installed at a larger number at various places on the vehicle body 10. Each of the electrical components 18 includes an electronic control unit (ECU) having a communication function of the Ethernet (registered trademark) standard, and is capable of performing wired communication via the communication system 100. A communication speed is assumed to be, for example, about 100 Mbps.

A transmission path of the communication system 100 shown in FIG. 1 is configured as a wire harness that is an assembly of electric wires. The wire harness includes trunk lines 76A, 76B, 76C, 76D, and 76E. Each of the trunk lines 76A to 76E includes a communication line of the Ethernet standard, a power supply line, and a ground line.

As shown in FIG. 1, switching hubs (SW-HUB) 71, 72, 73, and 74 are arranged at positions close to the four doors 10*a*, 10*b*, 10*c*, and 10*d*, respectively. In addition, a switching hub 75 is provided near a center between the two switching hubs 71 and 72.

In the example shown in FIG. 1, the trunk line 76A is wired to connect the two switching hubs 71 and 75. Similarly, the trunk line 76B is wired to connect the two switching hubs 72 and 75, the trunk line 76C is wired to connect the two switching hubs 71 and 73, the trunk line 76D is wired to connect the two switching hubs 72 and 74, and the trunk line 76E is wired to connect the two switching hubs 73 and 74.

A central gateway (GW) 77 is connected to the switching hub 75 via a communication line of the Ethernet standard. Alternatively, for example, functions of the switching hub 75 may be incorporated in the central gateway 77 to integrate the two.

The central gateway 77, which is a high-order ECU, constructs a virtual network (VLAN) on the communication system 100, and can control a communication path in the communication system 100 by using a routing map. By using the virtual network, one network (LAN) physically connected can be separated into a plurality of groups, and can be managed as a plurality of communication paths independent for each group.

In the example shown in FIG. 1, a plurality of electrical components 18 are connected to respective communication ports of the switching hubs 71 to 74 via a branch line 19. As described above, in the case of the communication system 100 installed in the vehicle, since types of devices such as the electrical components connected to communication nodes at respective positions are determined in advance, content of the routing map determining an appropriate communication path on the communication system 100 can also be determined in advance.

When a part of the wire harness is disconnected due to a traffic accident or the like, a condition where communication cannot be performed in a normal communication path occurs. In a case where an alternative path different from the normal communication path is prepared in advance, it is possible to secure a necessary communication path by switching from the normal communication path to the alternative path. An appropriate alternative path can be specified in advance for each portion where a failure such as disconnection occurs and for each communication node. Accordingly, a plurality of types of routing maps for selecting an appropriate alternative path for each portion where a failure occurs is determined in advance, and is held by the central gateway 77 and the switching hubs 71 to 75.

Therefore, when a failure such as disconnection occurs, the central gateway 77 and the switching hubs 71 to 75 can perform switching to select an appropriate routing map in accordance with a position of the failure, and can perform communication in an appropriate alternative path without being affected by the disconnection.

In practice, each of the switching hubs 71 to 75 has a function of detecting a failure such as disconnection as will be described later. When a failure occurs on any one of the trunk lines, a failure portion is identified and the routing map is automatically switched to an appropriate one, through communication between the switching hubs 71 and 75, and thus the communication paths can be switched so that communication is not affected by the failure.

In the communication system 100 of FIG. 1, since the trunk lines 76A to 76E are wired in a loop form so as to go around a vehicle interior of the vehicle body 10, even when a failure such as disconnection occurs at any one of the trunk lines 76A to 76E, a transmission path necessary for communication can be secured by selecting another path.

<Specific Example of Communication Path>

Figure 2A:
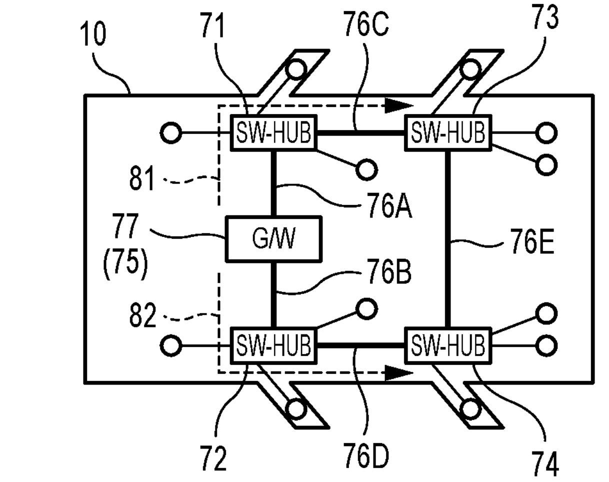
FIG. 2A is a block diagram showing a communication path in a first type of state in the communication system shown in FIG. 1.
Figure 2B:
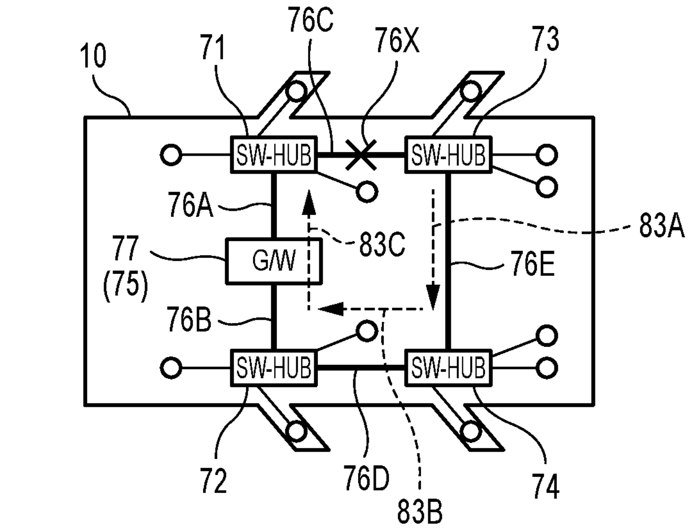
FIG. 2B is a block diagram showing the communication path in a second type of state in the communication system shown in FIG. 1.
Figure 2C:
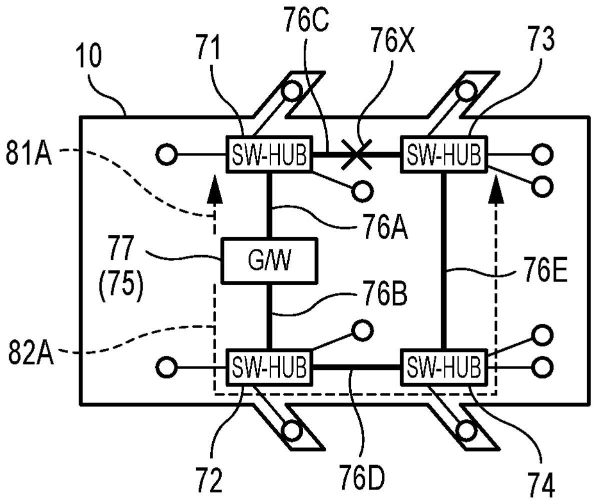
FIG. 2C is a block diagram showing the communication path in a third type of state in the communication system shown in FIG. 1.

A communication path in three types of states in the communication system 100 shown in FIG. 1 is shown in FIGS. 2A to 2C. FIG. 2A shows a normal communication path, FIG. 2B shows a path for providing a path switching instruction, and FIG. 2C shows an alternative path after switching. In the examples of FIGS. 2A to 2C, the central gateway 77 and the switching hub 75 in FIG. 1 are represented as being integrated.

In a normal state, as shown in FIG. 2A, the central gateway 77 and the switching hub 73 are connected via the trunk line 76A, the switching hub 71, and the trunk line 76C. Accordingly, when the central gateway 77 and the electrical component 18 on a downstream side of the switching hub 73 communicate with each other, a routing map is determined so as to use a communication path 81 in FIG. 2A.

That is, in this case, a path for communicating with the electrical component 18 from the central gateway 77 via the trunk line 76A, the switching hub 71, the trunk line 76C, the switching hub 73, and the branch line 19 is secured. Since the virtual network is employed, even when the communication path is physically connected, there is a portion where the path is logically dis connected.

Similarly, as shown in FIG. 2A, the central gateway 77 and the switching hub 74 are connected via the trunk line 76B, the switching hub 72, and the trunk line 76D. Accordingly, when the central gateway 77 and the electrical component 18 on a downstream side of the switching hub 74 communicate with each other, a routing map is determined so as to use a communication path 82 in FIG. 2A. That is, in this case, a path for communicating with the electrical component 18 from the central gateway 77 via the trunk line 76B, the switching hub 72, the trunk line 76D, the switching hub 74, and the branch line 19 is secured.

On the other hand, in FIG. 2B, it is assumed that a failure such as disconnection occurs at a disconnection portion 76X in the middle of the trunk line 76C. In the example of FIG. 2B, the switching hub 73 detects this disconnection. Accordingly, a path switching instruction from the switching hub 73 is transmitted to the switching hub 71 via instruction paths 83A, 83B, and 83C in order. Accordingly, the switching hub 71 switches between internal routing maps in accordance with the received instruction so as to select an appropriate path according to the disconnected position. Content of the switched routing map is also reflected in control of the central gateway 77.

After the routing map is switched in the state shown in FIG. 2B, communication paths 81A and 82A shown in FIG. 2C are preferentially selected based on the routing map and are used for actual communication. That is, when the central gateway 77 and the electrical component 18 downstream of the switching hub 71 communicate with each other, the communication path 81A is selected, and when the central gateway 77 and the electrical component 18 downstream of the switching hub 73 communicate with each other, the communication path 82A is selected.

The communication path 82A shown in FIG. 2C is connected from the central gateway 77 to the electrical component 18 via the trunk line 76B, the switching hub 72, the trunk line 76D, the switching hub 74, the trunk line 76E, the switching hub 73, and the branch line 19. That is, since it is known that a communication path of the trunk line 76C including the disconnection portion 76X cannot be used, the communication path 82A is preferentially selected as an alternative path of the trunk line 76C. As a result, effects of the disconnection portion 76X can be avoided.

<Internal Configuration of Switching Hub>

Figure 3:
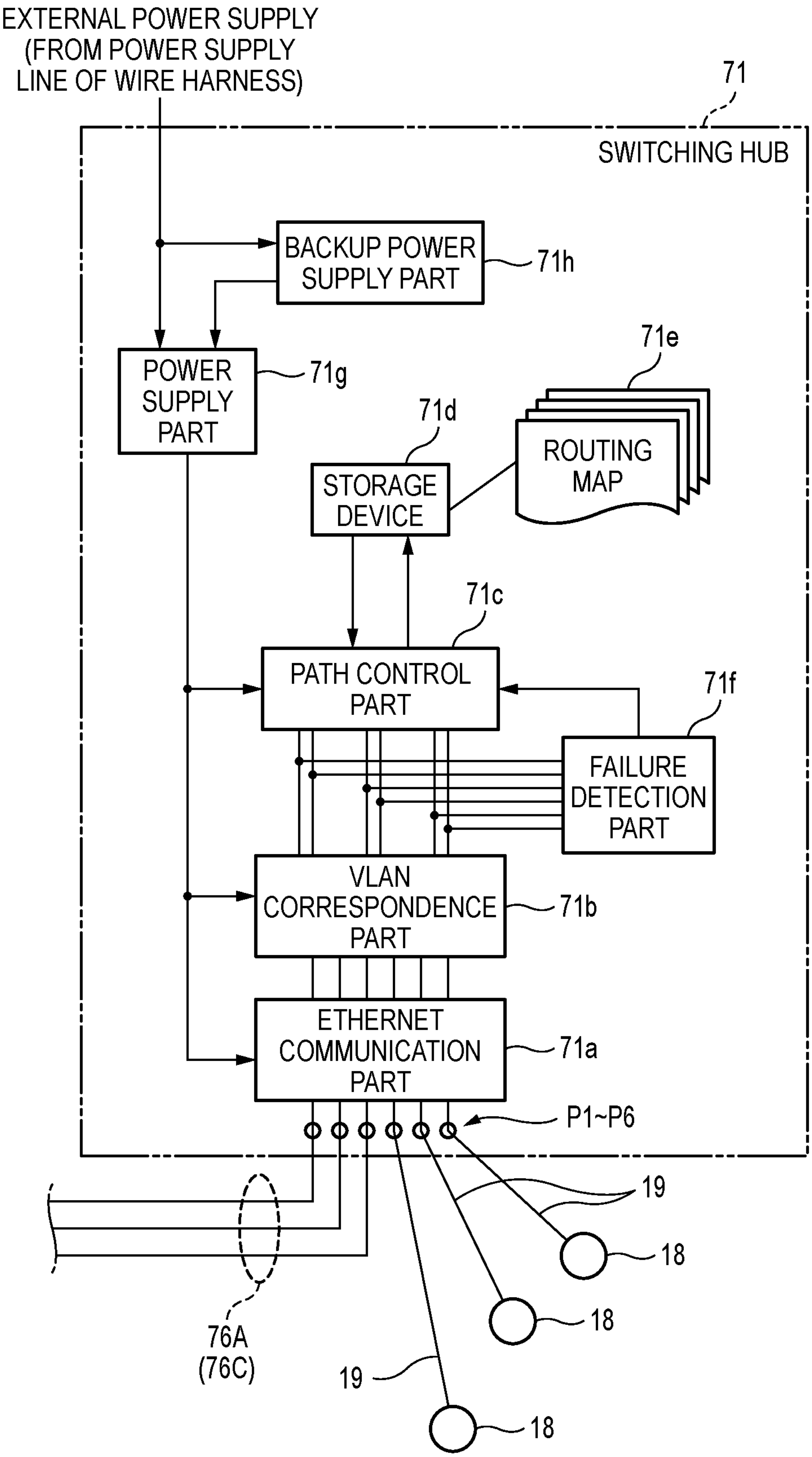
FIG. 3 is a block diagram showing an internal configuration example of one switching hub.

An internal configuration example of one switching hub 71 is shown in FIG. 3. Note that the other switching hubs 72 to 75 have the same configuration as the switching hub 71.

As shown in FIG. 3, the switching hub 71 includes an Ethernet communication part 71*a*, a VLAN correspondence part 71*b*, a path control part 71*c*, a storage device 71*d*, a routing map 71*e*, a failure detection part 71*f*, a power supply part 71*g* a backup power supply part 71*h*, and a plurality of communication ports P1 to P6.

The Ethernet communication part 71*a* is an interface for transmitting and receiving a signal frame corresponding to the Ethernet standard. In the example shown in FIG. 3, since the switching hub 71 has six communication ports P1 to P6, a plurality of communication lines, for example, the trunk lines 76A and 76C and a plurality of branch lines 19 shown in FIG. 1 can be connected to the communication ports P1 to P6.

The switching hub 71 can relay a signal frame input from any one of the communication ports P1 to P6, and send out the signal frame from one of the communication ports P1 to P6 to which a destination of the signal frame is connected. However, in a virtual network, in the communication ports P1 to P6 as physical ports existing in the same switching hub 71, the signal frame is not relayed between ports, which are not logically assigned to the same LAN group, due to separation thereof from each other.

The transmission source and destination of the signal frame transmitted by the switching hub 71 are specified and managed according to a media access control (MAC) address assigned to each device, a port number, a LAN group, or the like.

The VLAN correspondence part 71*b* manages signal frames of the communication ports P1 to P6 separately for each LAN group that is virtually assigned in advance. The central gateway 77 that is a high-order ECU determines which of a plurality of LAN groups each communication port of each of the switching hubs 71 to 75 is assigned to.

The nonvolatile storage device 71*d* holds the routing map 71*e* registered in advance. The routing map 71*e* includes, for each combination of a transmission source communication node and a destination communication node, a bit assignment table indicating which communication path is to be connected therebetween. For example, content corresponding to the communication paths 81 and 82 shown in FIG. 2A exists as bit assignment tables.

In addition to the bit assignment table used in a normal state, a plurality of bit assignment tables for preferentially selecting an alternative path determined in advance are registered in the routing map 71*e* in association with a disconnection portion, for each portion where a failure such as disconnection may occur. By switching the bit assignment tables used on the routing map 71*e*, for example, the communication paths 81A and 82A shown in FIG. 2C can be preferentially selected.

In accordance with a bit assignment table selected on the routing map 71*e*, the path control part 71*c* determines a transmission destination of a signal frame based on information such as a transmission source, a destination, and a next hop relay point included in the signal frame to be relayed, and sends out the signal frame from one of the communication ports P1 to P6 via the VLAN correspondence part 71*b* and the Ethernet communication part 71*a*.

The failure detection part 71*f* can detect presence or absence of a failure and a position at which the failure occurs, for example, by periodically performing communication with the other switching hubs 72 and 75 connected at adjacent positions. In addition to cutoff of communication such as disconnection, a decrease in communication quality in a state where a communication load between the switching hubs is overly large, in a state where impedance of the communication line is changed, or in a state where noise is increased can be detected.

When the failure detection part 71*f* detects cut-off of communication such as disconnection or detects a state where the communication quality decreases by a predetermined value or more, the path control part 71*c* switches the routing map 71*e* in the switching hub 71 to an appropriate bit assignment table according to a portion (equivalent to the disconnection portion 76X in FIG. 2B) of the occurrence. At the same time, the switching hub 71, which detects the failure, generates an instruction so as to switch the routing maps 71*e* in the other switching hubs 72 to 75.

For example, as shown in FIG. 2B, when the switching hub 73 detects a failure, an instruction generated by the switching hub 73 is transmitted to the other switching hub 71 through the instruction paths 83A, 83B, 83C, so that the routing map 71*e* on the switching hub 71 is rewritten.

Electric power of the switching hub 71 is normally supplied via a power supply line of a wire harness, and stable electric power generated by the power supply part 71*g* based on the electric power is supplied to an internal circuit of the switching hub 71, that is, the Ethernet communication part 71*a*, the VLAN correspondence part 71*b*, the path control part 71*c*, the failure detection part 71*f*, and the like.

On the other hand, the backup power supply part 71*h* provided in the switching hub 71 has a built-in power source such as a secondary battery. When supply of electric power to the switching hub 71 from the vehicle side is stopped due to disconnection of the wire harness or the like, the backup power supply part 71*h* in the switching hub 71 supplies the electric power required by the switching hub 71. Therefore, even when disconnection of the wire harness occurs, the function of the switching hub 71 can be maintained normally.

<State Change of Communication System>

Figure 4:
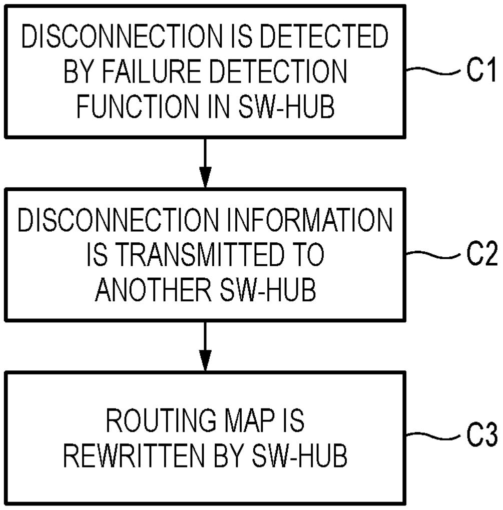
FIG. 4 is a state transition flowchart showing a state change of the communication system at the time when disconnection occurs.

A state change of the communication system 100 at the time when disconnection occurs is shown in FIG. 4. For example, as shown in FIG. 2B, when disconnection occurs at the disconnection portion 76X of the trunk line 76C, a state C1 shown in FIG. 4 is established. That is, the failure detection part 71*f* in the switching hub 71 or 73 detects this disconnection and specifies a position thereof (disconnection portion 76X).

Then, the state is transitioned to a state C2. For example, when the switching hub 73 detects the disconnection, by control of the path control part 71*c* in the switching hub 73, information indicating occurrence of disconnection and a position of the occurrence is transmitted from the switching hub 73 to the switching hub 71 on the opposite side via the instruction paths 83A, 83B and 83C shown in FIG. 2B.

In a next state C3, rewriting of the routing map 71*e* is automatically performed inside the switching hub 73 that detects the disconnection and the switching hub 71 that receives the disconnection information. In accordance with the routing map 71*e* after rewriting, the switching hubs 71 and 73 preferentially select an alternative path that bypasses the disconnection portion 76X.

<Control Operations of Communication System>

Figure 5:
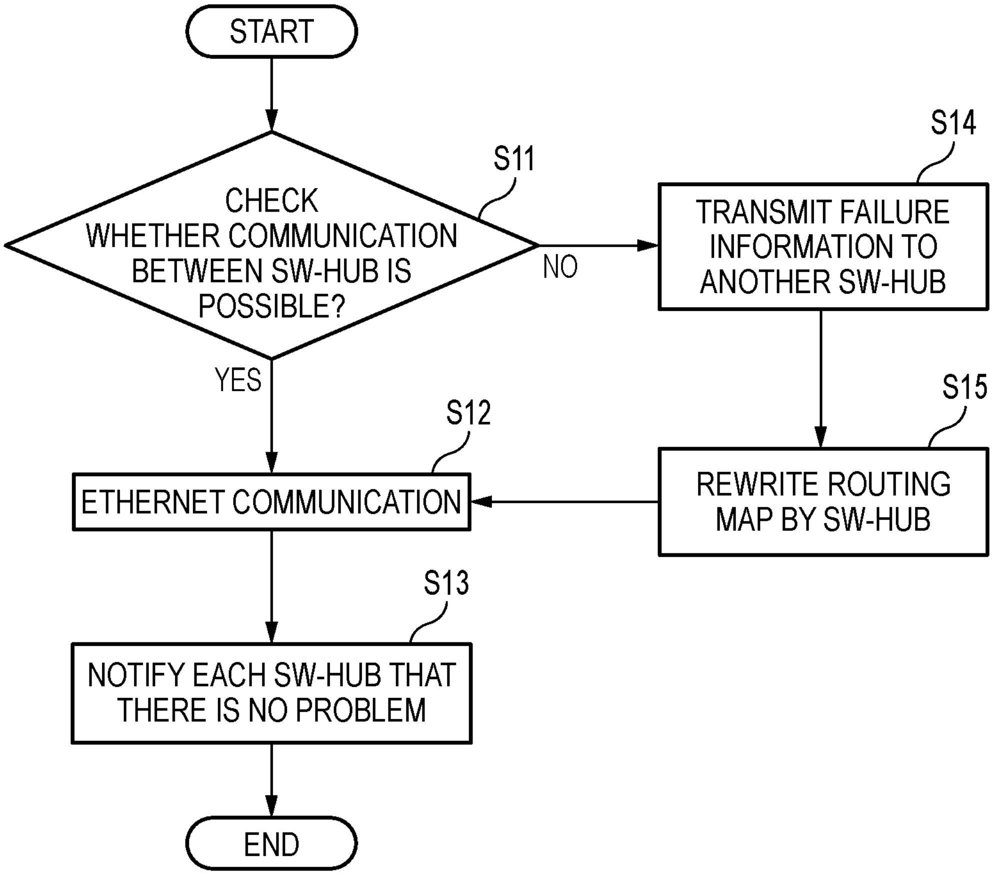
FIG. 5 is a flowchart showing control operations of the communication system for coping with the occurrence of disconnection.

Control operations of the communication system 100 for coping with occurrence of disconnection are shown in FIG. 5.

The failure detection part 71*f* existing in each of the switching hubs 71 to 75 constantly or periodically monitors and checks whether a communication path with another switching hub is in a usable state (S11).

When the communication path is usable without any problem, according to the routing map 71*e* in each of the switching hubs 71 to 75, the communication path determined by the path control unit 71*c* in each of the switching hubs 71 to 75 is used to perform communication of the Ethernet standard between the switching hubs 71 to 75 (S12).

By using the communication of the Ethernet standard, the failure detection part 71*f* in each of the switching hubs 71 to 75 notifies the other switching hub that there is no problem in the current communication path (S13).

When any one of the failure detection parts 71*f* in the switching hubs 71 to 75 detects a failure such as disconnection, the failure detection part 71*f* that detects the failure transmits generated failure information to the other switching hubs (S14).

When the failure information transmitted from the failure detection part 71*f* of the switching hub that detects the failure is received by the other switching hubs in the switching hubs 71 to 75, the other switching hubs receiving the failure information rewrite the routing maps 71*e* therein (S15). The switching hub that detects the failure also rewrites the routing map 71*e* therein. As a result, an alternative path that does not pass through the disconnection portion 76X is preferentially selected. Therefore, it is possible to avoid an increase in delay time of communication when disconnection occurs or when the communication quality deteriorates due to other causes.

Second Embodiment

<Outline of Configuration of Communication System>

Figure 6:
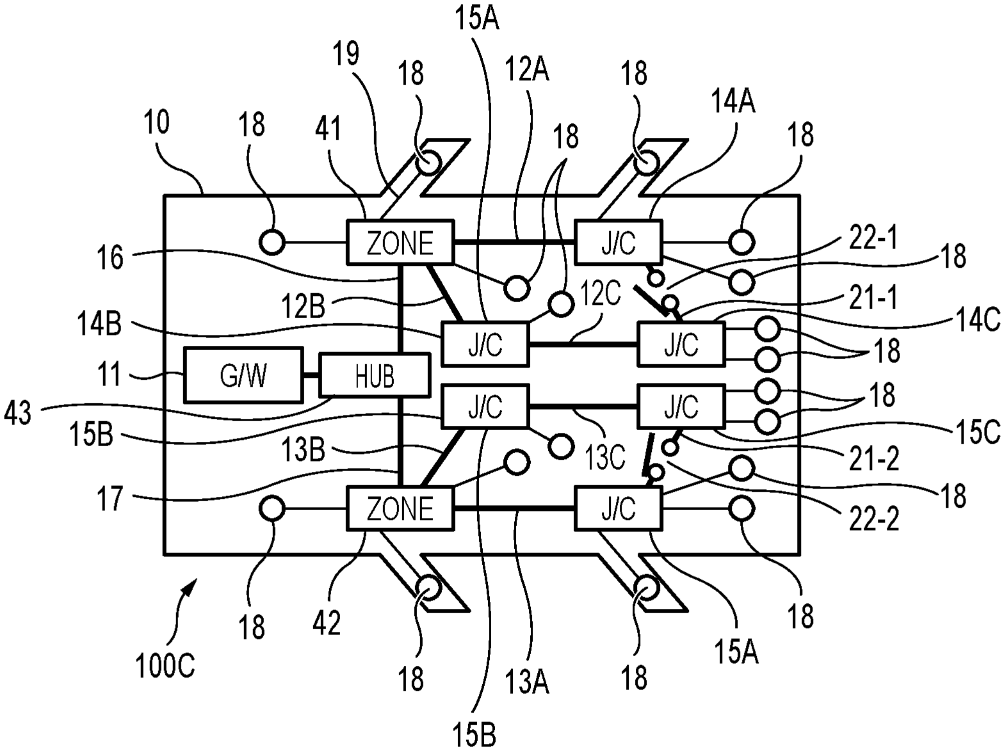
FIG. 6 is a block diagram showing a configuration of a communication system according to a second embodiment.

An outline of a configuration of a communication system 100C according to a second embodiment of the present invention is shown in FIG. 6.

It is assumed that the communication system 100C shown in FIG. 6 is used in a state of being mounted on a vehicle such as an automobile. FIG. 6 shows a layout of components in aplane as viewing the vehicle body 10 from above. In FIG. 6, a left side represents a front side of the vehicle body 10 and a right side represents a rear side of the vehicle body 10. The four doors 10*a*, 10*b*, 10*c*, and 10*d* are arranged on left and right sides of the vehicle body 10.

As shown in FIG. 6, various types of electrical components 18 are installed at a larger number at various places on the vehicle body 10. Each of the electrical components 18 includes an electronic control unit (ECU) having a communication function of a predetermined standard, and is capable of performing wired communication via the communication system 100C.

A communication network of the communication system 100C shown in FIG. 6 has a plurality of independent zones and a high-order communication network connecting the plurality of independent zones. In the example of FIG. 6, one zone is formed in a space on the right side of the vehicle body 10, and another zone is formed in a space on the left side. The zone on the right side is provided with a zone ECU 41 that manages this zone, and the zone on the left side is provided with a zone ECU 42 that manages this zone. A plurality of zones may be formed based on different characteristics instead of space, such as types of electrical components serving as control targets, required communication speeds, and functional groups on the vehicle.

An upstream side of the zone ECU 41 is connected to a central gateway (GW) 11 via a high-order communication bus 16 and a switching hub (HUB) 43. An upstream side of the zone ECU 42 is connected to a central gateway (GW) 11 via a high-order communication bus 17 and the switching hub 43. Alternatively, the switching hub 43 may be incorporated in the central gateway 11 to have the two integrated.

Each of the zone ECUs 41 and 42 has a gateway function for controlling an in-zone communication path on a downstream side, and holds a routing map indicating a path that is assigned in advance for each communication node. The central gateway 11 is a high-order ECU having a function of controlling all the communication paths in a plurality of zones, and holds a routing map for managing all the communication paths.

In the communication system 100C shown in FIG. 6, an in-zone communication network on a downstream side of the zone ECU 41 forms a CAN bus. An in-zone communication network on a downstream side of the zone ECU 42 also forms a CAN bus. Accordingly, a communication part in each of the zone ECUs 41 and 42, the electrical components 18, and joint connectors 14A, 14C, 15A, and 15C includes a communication interface corresponding to a CAN standard, and communication of the CAN standard is performed in each zone.

On the other hand, the high-order communication buses 16 and 17 are configured to comply with Ethernet communication standard. Accordingly, each of the zone ECU 41 connected to the high-order communication bus 16, the zone ECU 42 connected to the high-order communication bus 17, the switching hub 43 connected to the high-order communication buses 16 and 17, and the central gateway 11 incorporates a communication interface corresponding to the Ethernet, and performs Ethernet communication via the high-order communication buses 16 and 17.

As shown in FIG. 6, on the downstream side of the zone ECU 41, zone trunk lines 12A, 12B, 12C, and a backup line 21-1 are connected so as to form one loop. A switch 22-1 is connected in the middle of a path of the backup line 21-1. The switch 22-1 is a normally-off type switch that opens a circuit in a steady state, and is a switch capable of on-off control, such as a relay. Therefore, in the steady state, a part of the loop of an in-zone communication path is opened, and the backup line 21-1 is disconnected from the CAN bus.

The joint connector 14A is provided at an end of the zone trunk line 12A, the joint connectorl4B is provided in the middle of the zone trunk lines 12B and 12C, and the joint connector 14C is provided at an end of the zone trunk line 12C.

Each of the zone trunk lines 12A, 12B, 12C, and the backup line 21-1 is a communication transmission path corresponding to the CAN communication standard, and includes, for example, two communication lines, a power supply line, and a ground line. It is needless to say that the power supply line and the ground line may be prepared separately. In addition, another communication standard such as a CAN flexible data rate (CANFD) using a bus-type network similar to a CAN may be adopted instead of the CAN standard.

One or a plurality of branch lines 19 are connected to respective positions of the zone ECU 41 and the joint connectors 14A, 14B, and 14C, and electrical components 18 are connected to ends of the branch lines 19 respectively. Each branch line 19 includes two communication lines, a power supply line, and a ground line, each of which is formed of an electric wire thinner than that of the zone trunk line 12A.

Each of the joint connectors 14A, 14B, and 14C is an intermediate component for physically and electrically coupling an in-zone trunk line to a downstream branch line 19, and the zone ECU 41 also has a function of a joint connector. In addition, at least the joint connectors 14A and 14C at path end positions among the joint connectors 14A, 14B, and 14C have a disconnection detecting function as will be described later.

Further, on the downstream side of the zone ECU 42, zone trunk lines 13A, 13B, 13C, and a backup line 21-2 are connected so as to form one loop. A switch 22-2 is connected in the middle of a path of the backup line 21-2. The switch 22-2 is a normally-off type switch that opens a circuit in a steady state, and is a switch capable of on-off control, such as a relay. Therefore, in the steady state, a part of the loop of the in-zone communication path is opened, and the backup line 21-2 is in a disconnected state.

The joint connector 15A is provided at an end of the zone trunk line 13A, a joint connectorl5B is provided in the middle of the zone trunk lines 13B and 13C, and the joint connector 15C is provided at an end of the zone trunk line 13C.

Each of the zone trunk lines 13A, 13B, 13C, and the backup line 21-2 is a communication transmission path corresponding to the CAN communication standard, and includes, for example, two communication lines, a power supply line, and a ground line. It is needless to say that the power supply line and the ground line may be prepared separately. In addition, another communication standard such as CANFD using a bus-type network similar to a CAN may be adopted instead of the CAN standard.

One or a plurality of branch lines 19 are connected to respective positions of the zone ECU 42 and the joint connectors 15A, 15B, and 15C, and the electrical components 18 are connected to ends of the branch lines 19 respectively. That is, each of the joint connectors 15A, 15B, and 15C is a component for coupling an in-zone trunk line to a downstream branch line 19, and the zone ECU 42 also has a function of a joint connector. In addition, at least the paths 15A and 15C at path end positions, among the joint connectors 15A, 15B, and 15C, have a disconnection detecting function as will be described later.

Each of the zone ECUs 41 and 42 is an electronic control unit having a plurality of communication interfaces, a routing map, and a control part. For each communication interface, an upstream side thereof corresponds to the Ethernet, and a downstream side thereof corresponds to the CAN standard. Communication paths for communication of the electrical components 18 and the like in the zone are usually determined based on content of routing maps in the zone ECUs 41 and 42 and the central gateway 11.

The content assigned to a routing map indicates communication paths to the electrical components 18 via the central gateway 11, the zone ECUs 41 and 42, the zone trunk lines 12A to 12C and 13A to 13C, the joint connectors 14A to 14C and 15A to 15C, the branch lines 19, and the like, and a path is separately assigned to each communication node.

<Connection State of Zone Trunk Line End>

Figure 7A:
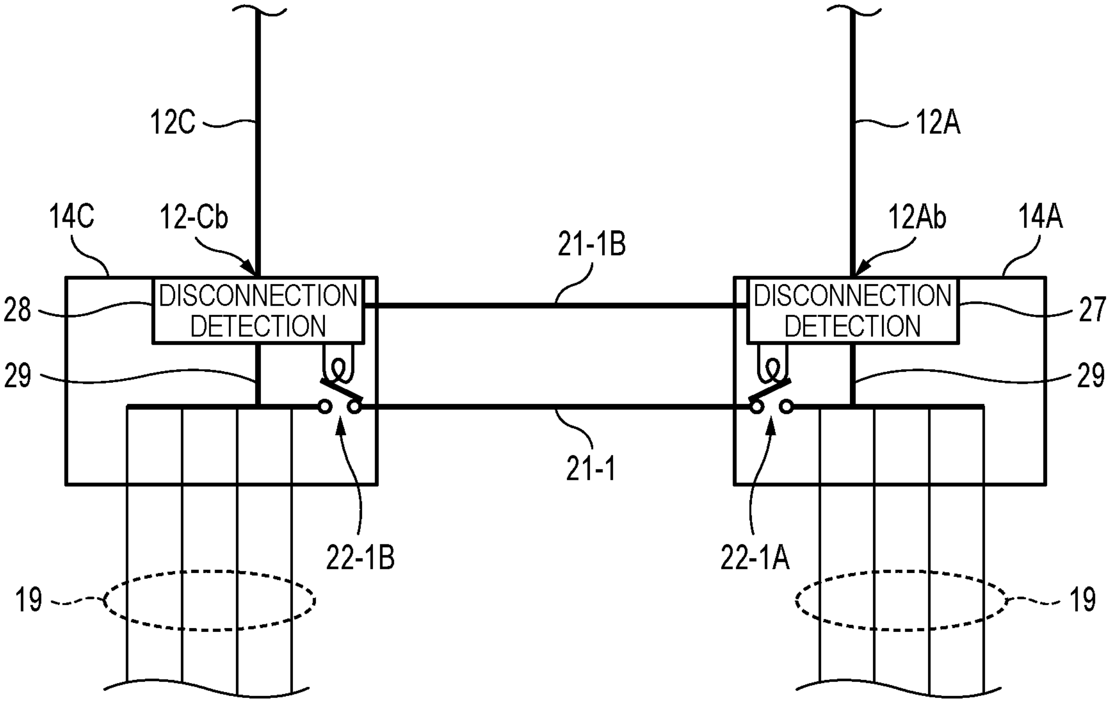
FIG. 7A is an electric circuit diagram showing a connection state of a plurality of trunk line ends included in the communication system, specifically showing a normal state thereof.
Figure 7B:
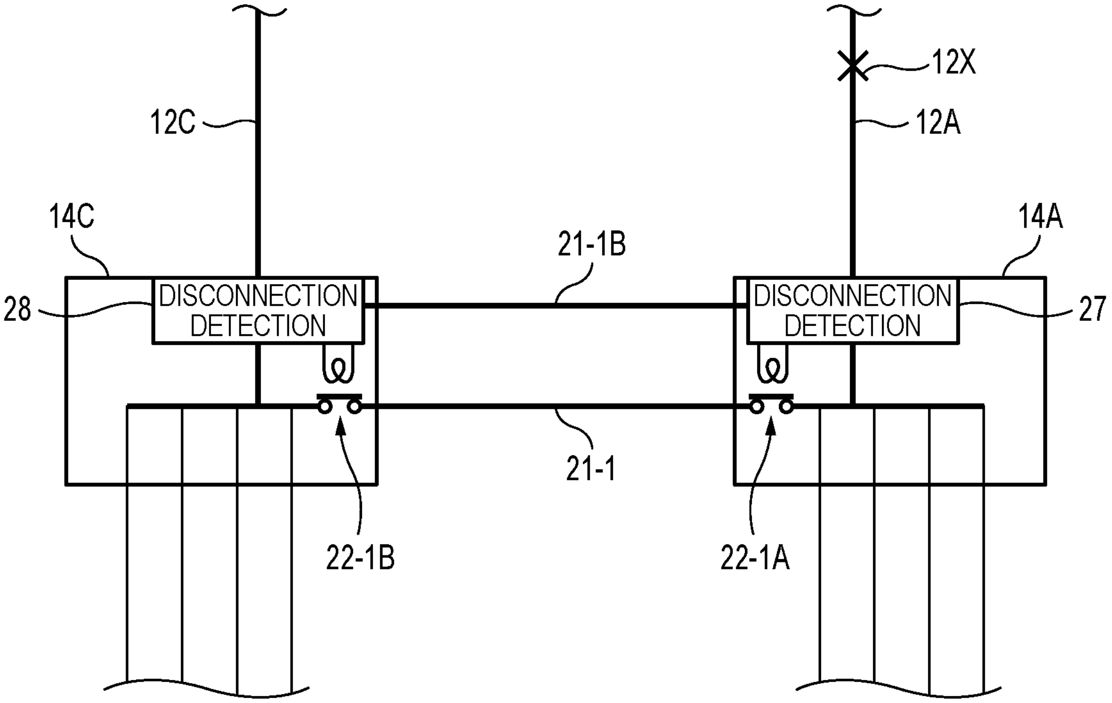
FIG. 7B is an electric circuit diagram showing a connection state of the plurality of trunk line ends included in the communication system, specifically showing a connected state at the time when disconnection occurs.

Specific examples of connection states at ends 12Ab and 12Cb of the plurality of zone trunk lines 12A and 12C included in the communication system 100C of FIG. 6 are shown in FIGS. 7A and 7B. FIG. 7A shows a normal state, and FIG. 7B shows a connection state at the time when disconnection occurs.

In the communication system 100C, as shown in FIGS. 7A and 7B, the end 12Ab of the zone trunk line 12A is connected to the joint connector 14A, and the end 12Cb of the zone trunk line 12C is connected to the joint connector 14C. Further, in the example of FIGS. 7A and 7B, the backup line 21-1 is connected between the two joint connectors 14A and 14C constantly, and switches 22-1A and 22-1B that establish and cut off the connection of the backup line 21-1 are built in the respective joint connectors 14A and 14C. In addition, a disconnection information transmission circuit (electric wire) 21B for transmitting a dedicated signal between the two joint connectors 14A and 14C is provided in parallel with the backup line 21-1.

The end 12Ab of the zone trunk line 12A and a plurality of branch lines 19 are electrically connected by a connection portion 29 inside the joint connector 14A. Similarly, the end 12Cb of the zone trunk line 12C and a plurality of branch lines 19 are electrically connected by the connection portion 29 inside the joint connector 14C. Each of the switches 22-1A and 22-1B establishes and cuts off connection between the backup line 21-1 and the connection portion 29.

A disconnection detection unit 27 for detecting disconnection of the zone trunk line 12A is provided inside the joint connector 14A, and a disconnection detection unit 28 for detecting disconnection of the zone trunk line 12C is provided inside the joint connector 14C. The disconnection detection unit 27 controls opening and closing of the switch 22-1A. Similarly, the disconnection detection unit 28 controls opening and closing of the switch 22-1B. Upon detecting disconnection, the disconnection detection unit 27 transmits information on the disconnection to the disconnection detection unit 28 via the disconnection information transmission circuit 21-1B. Similarly, upon detecting disconnection, the disconnection detection unit 28 transmits information on the disconnection to the disconnection detection unit 27 via the disconnection information transmission circuit 21-1B.

In a state where no disconnection occurs in any of the zone trunk lines 12A and 12C, the switch 22-1A in the joint connector 14A is opened and the switch 22-1B in the joint connector 14C is also opened as shown in FIG. 7A, so that the backup line 21-1 is disconnected from the communication path. On the other hand, when disconnection occurs at a disconnection portion 12X of the zone trunk line 12A, the switch 22-1A in the joint connector 14A is closed and the switch 22-1B in the joint connector 14C is also closed as shown in FIG. 2B, so that the backup line 21-1 can be used as a communication path between the two joint connectors 14A and 14C.

<Example of Communication Path>

Figure 8A:
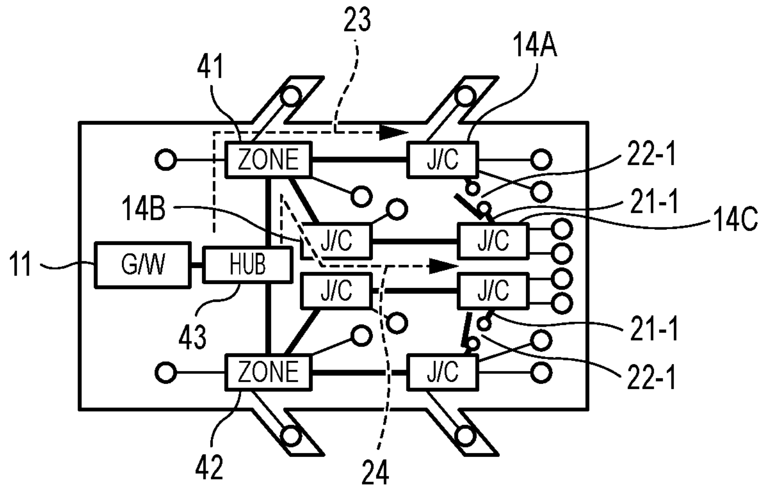
FIG. 8A is a block diagram showing a communication path in a first type of state in the communication system shown in FIG. 6.
Figure 8B:
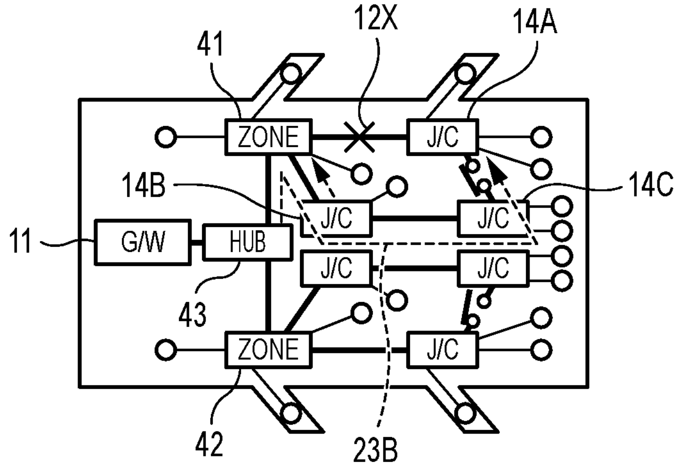
FIG. 8B is a block diagram showing the communication path in a second type of state in the communication system shown in FIG. 6.

FIGS. 8A and 8B show a communication path in two types of states in the communication system 100C shown in FIG. 6. FIG. 8A shows the communication path in a steady state, and FIG. 8B shows the communication path at the time when a failure occurs.

For example, in the zone on the right side of the vehicle body 10, in a state where no failure such as disconnection occurs in the zone trunk lines 12A to 12C, communication can be performed using communication paths 23 and 24 as shown in FIG. 8A. For example, when communication is to be performed between the electrical component 18, which is connected to the end of the zone trunk line 12A via the joint connector 14A and the branch line 19, and the electrical component 18, which is connected to the end of the zone trunk line 12C via the joint connector 14C and the branch line 19, the communication can be performed using the communication paths 23 and 24 shown in FIG. 8A. That is, the communication path 23 passing through the central gateway 11, the zone ECU 41, the zone trunk line 12A, and the joint connector 14, and the communication path 24 passing through the central gateway 11, the zone ECU 41, the zone trunk lines 12B and 12C, and the joint connectors 14B and 14C can be used.

Since such information on available communication paths is usually determined in advance and registered in the routing maps on the central gateway 11 and the zone ECUs 41 and 42, the communication path can be determined immediately based on the routing maps when the communication is started.

On the other hand, in a state shown in FIG. 8B, it is assumed that disconnection occurs at the disconnection portion 12X in the middle of the trunk line 12A connecting the zone ECU 41 and the joint connector 14A. Therefore, in the state shown in FIG. 8B, communication cannot be performed in the communication path 23 in FIG. 8B.

Therefore, the communication system 100C closes the switch 22-1 as shown in FIG. 8B to enable use of a new communication path 25 in which the two joint connectors 14A and 14C are connected by the backup line 21-1. Further, an instruction is sent from the disconnection detection unit 28 in the joint connector 14C that detects the failure to the zone ECU 41 via the joint connector 14B so that the communication path 25 can be used immediately. Upon receiving the instruction, the zone ECU 41 automatically rewrites the content of the routing map on the zone ECU 41 in accordance with the instruction.

In practice, since a plurality of types of bit assignment tables for preferentially using an appropriate alternative path is determined in advance for each failure occurrence portion and is held on the routing maps, the zone ECU 41 selects an appropriate bit assignment table in correspondence to failure portion information contained in the instruction transmitted by the disconnection detection unit 28 in the joint connector 14C, and rewrites the routing map thereof As a result, for example, when communication is to be performed between the electrical component 18 on the downstream side of the joint connector 14A and the electrical component 18 on the downstream side of the joint connector 14C in the state shown in FIG. 8B, path switching is performed so as to start communication immediately using the communication path 25. That is, the communication is started in the communication path 25 passing through the joint connector 14A, the backup line 21-1, the switch 22-1, the joint connector 14C, the zone trunk line 12C, the joint connector 14B, the zone trunk line 12B, the zone ECU 41, the high-order communication bus 16, and the central gateway 11.

Since the disconnection portion 12X is not used in the communication path 25, occurrence of delay can be avoided. Since the content of the routing maps on the central gateway 11 and the zone ECUs 41 and 42 is rewritten so as to use the communication path 25 by communication between the plurality of electrical components 18, the communication path 25 can be used immediately after the start of the communication.

In the state shown in FIG. 8B, since the disconnection portion 12X exists, an entire loop of a path passing through the zone trunk lines 12A, 12B, and 12C is not closed even when the two joint connectors 14A and 14C are connected by the backup line 21-1 and the switch 22-1, and a correct routing map can be created without any problem at the CAN communication standard. The zone on the left side of the vehicle body 10 is also controlled similarly to the zone on the right side.

<State Change of Communication System>

Figure 9:
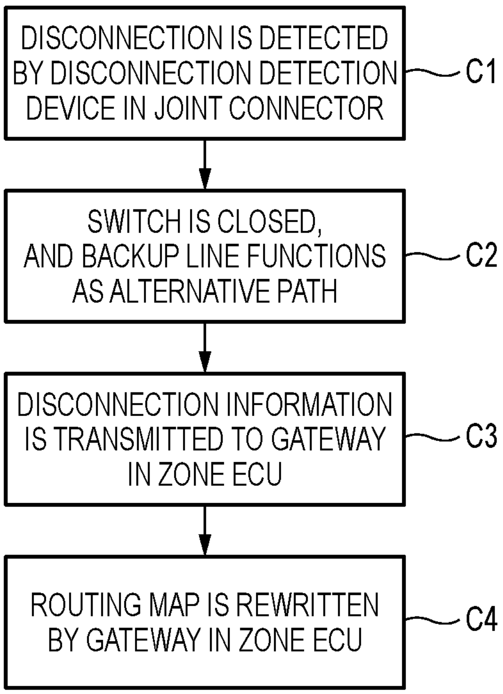
FIG. 9 is a state transition flowchart showing a state change of the communication system at the time when disconnection occurs.

A state change of the communication system 100C at the time when disconnection occurs is shown in FIG. 9.

For example, when disconnection occurs at the disconnection portion 12X of the zone trunk line 12A as shown in FIG. 8B, a state Cl in FIG. 9 is established. That is, a disconnection detection part 31 (see FIG. 11) detects the disconnection of the zone trunk line 12A by the disconnection detection unit 27 in the joint connector 14A.

Figure 11:
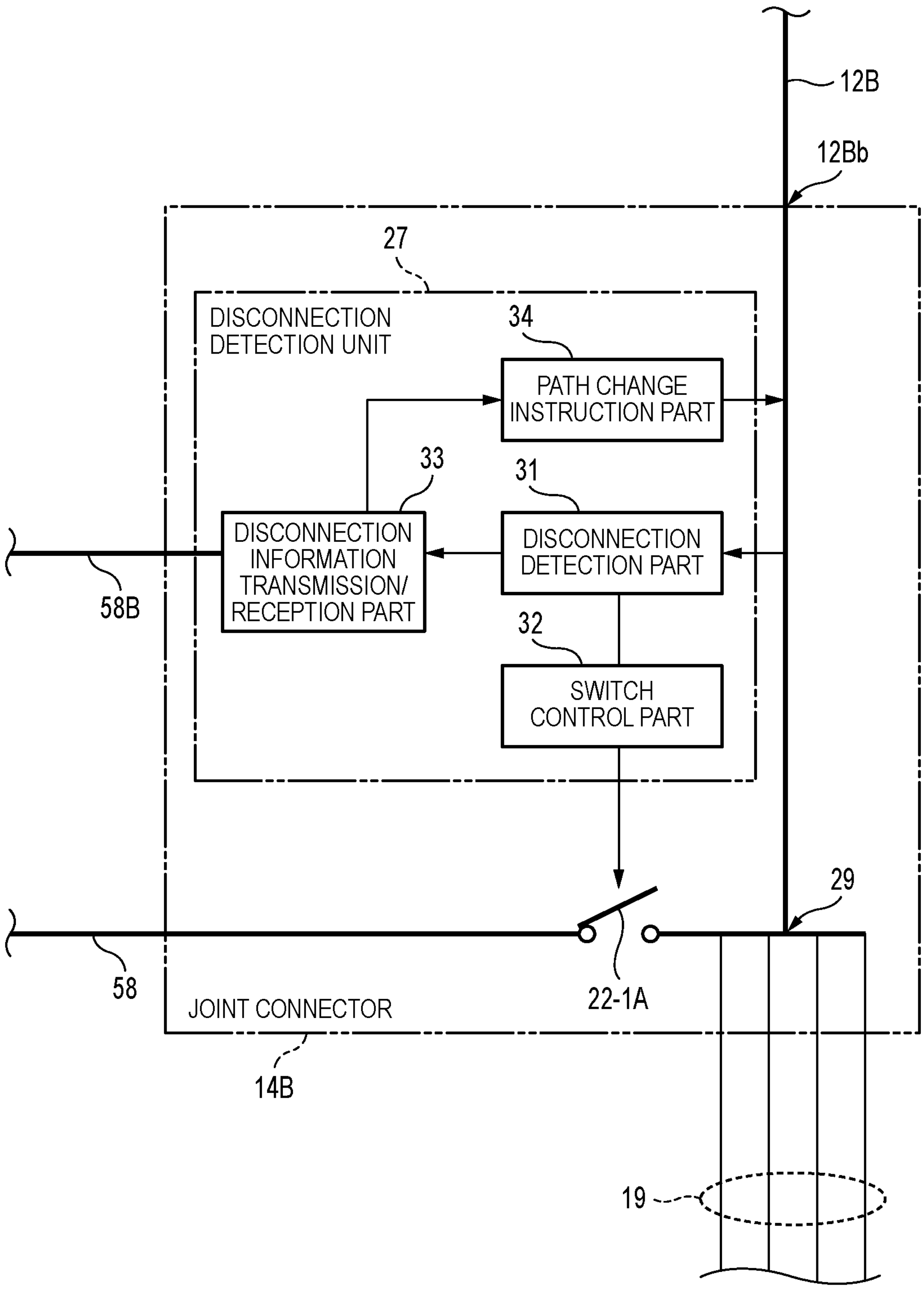
FIG. 11 is a block diagram showing a specific example of an internal configuration of a joint connector at one trunk line end.

Then, the state is transitioned to a state C2, and contacts of the switch 22-1A are closed under control of a switch control part 32 (see FIG. 11). Further, since contacts of the switch 22-1B are also closed on the disconnection detection unit 28 side, the backup line 21-1 is available as an alternative path.

In a next state C3, the disconnection detection unit 28 that receives disconnection information transmits the disconnection information to the zone ECU 41 or the like serving as a gateway by using a communication path passing through the zone trunk line 12C in which no disconnection occurs.

In a next state C4, by control of a gateway in the zone ECU 41 that receives the disconnection information, that is, a path change instruction from the disconnection detection unit 28, a routing map is automatically rewritten so as to use the path of the backup line 21-1.

<Control Operations of Communication System>

Figure 10:
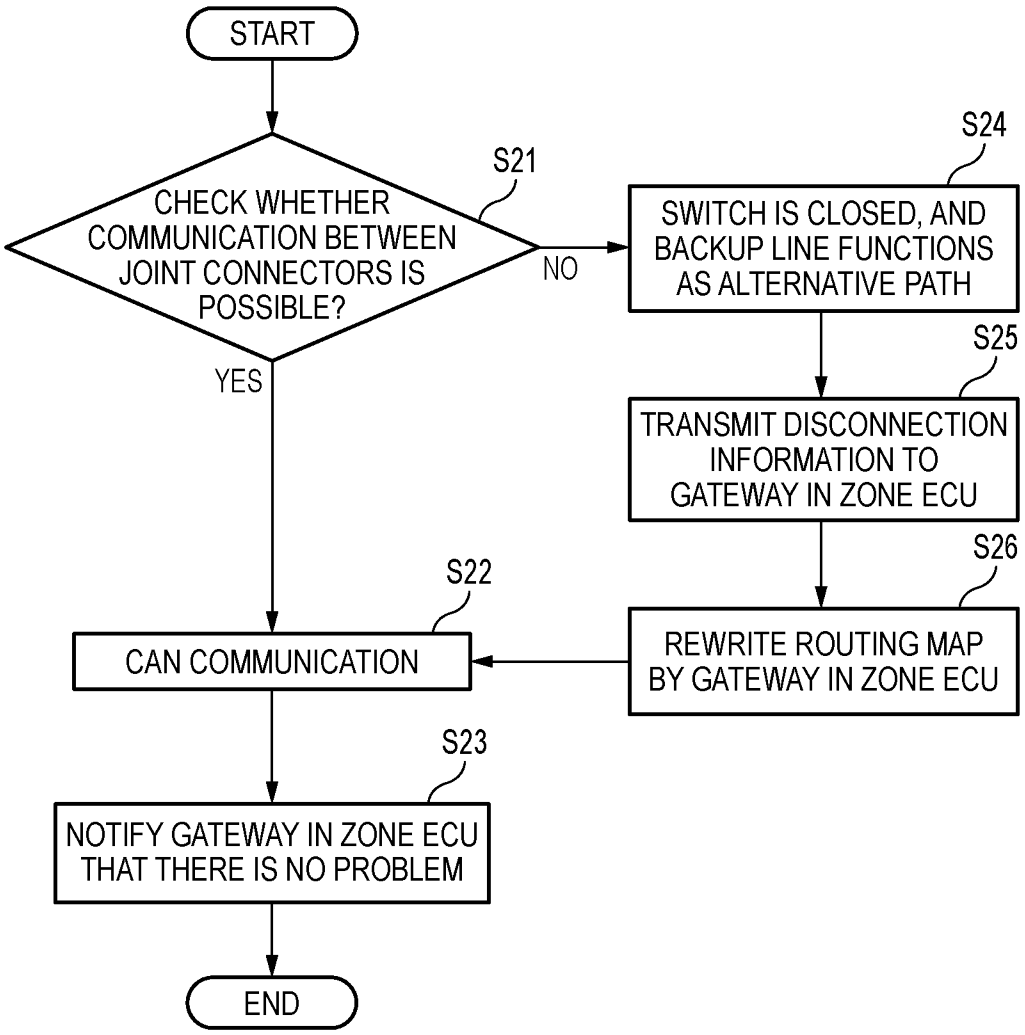
FIG. 10 is a flowchart showing control operations of the communication system for coping with the occurrence of disconnection.

Control operations of the communication system 100C for coping with occurrence of disconnection are shown in FIG. 10.

The disconnection detection unit 27 or 28 existing in each of the joint connectors 14A to 14C constantly or periodically monitors and checks whether communication paths to the other two joint connectors can be used (electrically connected), and similarly the disconnection detection unit 27 or 28 existing in each of the joint connectors 15A to 15C constantly or periodically monitors and checks whether communication paths to the other two joint connectors can be used (electrically connected) (S21).

When the communication paths can be used without any problem, according to the routing map of the zone ECU 41, the disconnection detection unit 27 or 28 in each of the joint connectors 14A to 14C performs communication of the CAN standard with the zone ECU 41 by using a communication path determined by the zone ECU 41, and similarly according to the routing map of the zone ECU 42, the disconnection detection unit 27 or 28 in each of the joint connectors 15A to 15C performs communication of the CAN standard with the zone ECU 42 by using a communication path determined by the zone ECU 42 (S22).

The disconnection detection unit 27 or 28 in each of the joint connectors 14A to 14C uses the communication of the CAN standard to notify the gateway in the zone ECU 41 that there is no problem in the current communication path, and similarly the disconnection detection unit 27 or 28 in each of the joint connectors 15A to 15C uses the communication of the CAN standard to notify the gateway in the zone ECU 42 that there is no problem in the current communication path (S23).

When the disconnection detection unit 27 or 28 of any of the joint connectors 14A to 14C detects disconnection, the disconnection detection unit 27 or 28 that detects the disconnection closes the switch 22-1 to make the backup line 21-1 available as an alternative path, and similarly when the disconnection detection unit 27 or 28 of any of the joint connectors 15A to 15C detects disconnection, the disconnection detection unit 27 or 28 that detects the disconnection closes the switches 22-2 to make the backup line 21-2 available as an alternative path (S24).

Further, in order to use the alternative path, the disconnection information generated by the disconnection detection unit 27 or 28 is transmitted to the gateway in the zone ECU 41 or 42 correspondingly (S25).

When the gateway in the zone ECU 41 receives the disconnection information transmitted from the disconnection detection unit 27 or 28 in any of the joint connectors 14A to 14C, the gateway rewrites the routing map therein, and similarly when the gateway in the zone ECU 42 receives the disconnection information transmitted from the disconnection detection unit 27 or 28 in any of the joint connectors 15A to 15C, the gateway rewrites the routing map therein (S26). Accordingly, for example, the path passing through the disconnection portion 12X is excluded, and assignment of the communication path is changed so as to use the path of the backup line 21-1 instead.

Therefore, in the communication system 100C that performs the control as shown in FIG. 10, when a failure such as disconnection at the disconnection portion 12X occurs, the content of the routing map of the zone ECU 41 and/or the zone ECU 42 is switched so as to use an alternative path other than the disconnected path. Therefore, even when disconnection occurs, it is possible to avoid an increase in delay time of communication.

<Internal Configuration of Joint Connector>

An example of a configuration of the disconnection detection unit 27 is shown in FIG. 11. As shown in FIG. 11, the disconnection detection unit 27 in the joint connector 14B includes the disconnection detection part 31, the switch control part 32, a disconnection information transmission/reception part 33, and a path change instruction part 34. The disconnection detection unit 28 in the joint connector 15B has the same configuration as the disconnection detection unit 27.

The disconnection detection part 31 can detect presence or absence of disconnection in the zone trunk line 12B. For example, the disconnection detection part 31 can detect the presence or absence of disconnection by monitoring any one or a combination of a potential difference between two communication lines, a potential of each communication line, presence or absence of change in the potential or potential difference, and impedance between communication lines.

Normally, the switch control part 32 performs control so that the contacts of the switch 22-1A are open, and when disconnection is detected by the disconnection detection part 31, the switch control part 32 switches the switch 22-1A to a state where the contacts thereof are closed.

When disconnection is detected by the disconnection detection part 31 in the disconnection detection unit 27, the disconnection information transmission/reception part 33 transmits disconnection information to the disconnection detection unit 28 on the other side via a disconnection information transmission circuit 58B. In addition, when disconnection is detected by the disconnection detection unit 28 on the other side, the disconnection information transmission/reception part 33 in the disconnection detection unit 27 receives disconnection information transmitted to the disconnection information transmission circuit 58B by the disconnection detection unit 28 and transmits the disconnection information to the path change instruction part 34 therein.

The path change instruction part 34 includes a communication interface of the CAN standard, and transmits information for instructing change of path to the zone ECU 41, the zone ECU 42 or the like by using a communication path of the zone trunk line 12C, in which no disconnection occurs, in accordance with the disconnection information received by the disconnection information transmission/reception part 33.

<Advantages of Communication System>

In the communication system 100 shown in FIG. 1, the transmission paths of the trunk lines 76A to 76E used by the respective communication nodes are formed in a loop form, and paths of a plurality of communication types are configured so as to be used in a selective manner physically and logically. Therefore, when a failure such as disconnection or decrease in communication quality occurs, it is possible to switch to another communication path that does not pass through the portion of failure. In addition, since failure detection, transmission of a path switching instruction, and rewriting of the routing map in accordance with the instruction are performed automatically by using functions of the switching hubs 71 to 75, the communication path having no failure is preferentially selected at the time of failure occurrence, and delay of communication can be avoided.

Further, since the virtual network is constructed, it is possible to assign an appropriate communication path to each communication node without installing an expensive communication device such as a router or an L3 switch at portions of the switching hubs 71 to 75. Further, in the case of an on-vehicle communication system, since the types of the electrical component 18 connected to the position of each communication node, a shape of the wire harness, and the like are known in advance, an appropriate communication path to be selected when a failure occurs can be determined in advance and registered in advance on the routing map 71*e*. Therefore, it is possible to instantly rewrite the routing map according to a failure occurrence portion.

In the communication system 100C shown in FIG. 6, since the zone trunk lines 12A to 12C and the backup line 21-1 in each zone are formed in a loop form, another communication path that bypasses the failure occurrence portion can be secured for each zone when a failure occurs. Further, since a part of the loop is opened by turning off the switch 22-1 in a steady state, an appropriate routing map can also be created in the communication system 100C in which the communication path of the CAN bus is used on the downstream side of the zone ECUs 41 and 42. Further, when a failure occurs, the zone ECU 41 rewrites the routing map based on the information transmitted from the joint connectors 14A and 14C, which detect the failure, to the zone ECU 41, and thus the communication path of the backup line 21-1 can be preferentially selected for communication.

An on-vehicle communication system (100) in which a relay device (switching hubs 71 to 75) capable of relay of communication and path selection according to a destination of communication is provided at each of a plurality of positions, for which branching off is possible, on a wire harness including a trunk line of a communication line.

In the on-vehicle communication system, each of a plurality of the relay devices includes:

- a failure detection part (71*f*) that detects disconnection or decrease in communication quality;
- a routing map (71*e*) in which a plurality of types of path information determined in advance is held in correspondence to presence or absence of a failure and each failure portion; and
- a path control part (71*c*) that controls switching of the routing map,
- in which the trunk line (76A to 76E) of a communication line is formed in a state where it is possible to selectively use a plurality of types of paths physically or logically (see FIG. 1),
- in which when the failure detection part of any relay device detects failure occurrence, the path control part in the relay device whose failure detection part detects the failure occurrence instructs another relay device to change a path (S14), and
- in which when the failure detection part of any relay device receives an instruction of path change from another relay device, at least the routing map in the relay device whose failure detection part receives the instruction of path change is switched in accordance with a failure occurrence portion (S15).

According to the on-vehicle communication system having the above configuration, even when a failure such as disconnection occurs at a portion of any communication line, a communication line of another path having no failure can be used, and thus it is possible to secure a necessary communication path by switching between communication paths. In addition, since the failure detection part, the routing map, and the path control part exist in each relay device, the routing maps can be automatically switched by communication between the relay devices when a failure occurs, and delay time of communication can be avoided from increasing since a path having no failure can be preferentially selected.

In the on-vehicle communication system, the trunk line of the communication line may form one or more loops that are possible to be at least physically closed so as to go around a region on a vehicle (see FIG. 1).

According to the on-vehicle communication system having the above configuration, since the trunk line of the communication line forms one or more loops, even when disconnection occurs at a portion of the loop, another communication path that does not pass through the disconnection portion can be secured. Further, since the loop is formed so as to go around a certain region on the vehicle, it is possible to avoid disconnection at a plurality of portions of the loop at the same time even when a traffic accident or the like occurs.

In the on-vehicle communication system, each of the plurality of relay devices may have a VLAN processing part (VLAN correspondence part 71*b*) that logically divides and assigns an entire physical LAN connection including a plurality of physical ports into a plurality of groups to form a plurality of virtual LAN segments.

According to the on-vehicle communication system having the above configuration, one communication network (LAN) physically connected can be logically divided into a plurality of groups and individually managed for each group. Therefore, even when a communication device such as an expensive router or an L3 switch is not connected to the wire harness at a large number, communication paths such as redundant paths used at the time of disconnection can be appropriately switched by the control of the relay device.

In the on-vehicle communication system, each of the plurality of relay devices may include a backup power supply (backup power supply part 71*h*), and when a failure occurs in power supply from outside to the relay device, the backup power supply may supply required electric power to an internal circuit of the relay device.

According to the on-vehicle communication system having the above configuration, even when a part of the wire harness is disconnected at the time of a traffic accident or the like of the own vehicle and the supply of electric power from the vehicle side to the relay device is cut off, electric power supplied by the backup power source inside the relay device can be used, so that the function of the relay device can be maintained.

According to the on-vehicle communication system of the present invention, when a failure such as disconnection of one communication path occurs, it is possible to use another communication path that is not disconnected and to reduce communication delay. Further, an increase in cost of the communication device can be prevented.

What is claimed is:

1. An on-vehicle communication system in which a relay device capable of relay of communication and path selection according to a destination of communication is provided at each of a plurality of positions, for which branching off is possible, on a wire harness including a trunk line of a communication line, wherein each of a plurality of the relay devices comprises:

a failure detection part that detects disconnection or decrease in communication quality;

a routing map in which a plurality of types of path information determined in advance is held in correspondence to presence or absence of a failure and each failure portion; and a path control part that controls switching of the routing map, wherein the trunk line of the communication line is formed in a state where it is possible to selectively use a plurality of types of paths physically or logically, wherein when the failure detection part of any relay device detects failure occurrence, the path control part in the relay device whose failure detection part detects the failure occurrence instructs another relay device to change a path, and wherein when the failure detection part of any relay device receives an instruction of path change from another relay device, at least the routing map in the relay device whose failure detection part receives the instruction of path change is switched in accordance with a failure occurrence portion.

2. The on-vehicle communication system according to claim 1, wherein the trunk line of the communication line forms one or more loops that are possible to be at least physically closed so as to go around a region on a vehicle.

3. The on-vehicle communication system according to claim 1, wherein each of the plurality of relay devices has a VLAN processing part that logically divides and assigns an entire physical LAN connection including a plurality of physical ports into a plurality of groups to form a plurality of virtual LAN segments.

4. The on-vehicle communication system according to claim 1, wherein each of the plurality of relay devices includes a backup power supply, and wherein when a failure occurs in power supply from outside to the relay device, the backup power supply supplies required electric power to an internal circuit of the relay device.

* * * * *